United States Patent
Meily (10) Patent No.: US 11,550,883 B2
(45) Date of Patent: Jan. 10, 2023

(54) CODE PROTECTION

(71) Applicant: Assured Information Security, Inc., Rome, NY (US)

(72) Inventor: Adam Meily, Springboro, OH (US)

(73) Assignee: ASSURED INFORMATION SECURITY, INC., Rome, NY (US)

(*) Notice: Subject to any disclaimer, the term of this patent is extended or adjusted under 35 U.S.C. 154(b) by 196 days.

(21) Appl. No.: 17/014,145

(22) Filed: Sep. 8, 2020

(65) Prior Publication Data

US 2022/0075847 A1 Mar. 10, 2022

(51) Int. Cl.
| G06F 21/12 | (2013.01) |
| G06F 21/60 | (2013.01) |
| G06F 21/10 | (2013.01) |
| G06F 9/445 | (2018.01) |

(52) U.S. Cl.
CPC ........ *G06F 21/125* (2013.01); *G06F 9/44589* (2013.01); *G06F 21/105* (2013.01); *G06F 21/602* (2013.01); *G06F 2221/0753* (2013.01)

(58) Field of Classification Search
CPC .... G06F 21/125; G06F 21/105; G06F 21/602; G06F 2221/0753; G06F 9/44589
USPC .......................................................... 713/190
See application file for complete search history.

(56) References Cited

U.S. PATENT DOCUMENTS

| 6,463,538 | B1 | 10/2002 | Elteto |
| 7,124,445 | B2 | 10/2006 | Cronce et al. |
| 7,287,166 | B1 | 10/2007 | Chang et al. |
| 7,516,331 | B2 | 4/2009 | Jin et al. |
| 7,590,863 | B2 | 9/2009 | Lambert |
| 8,516,273 | B2 | 8/2013 | Vijay et al. |
| 9,021,271 | B1* | 4/2015 | Richards ................. G06F 11/34 713/189 |
| 9,443,064 | B2 | 9/2016 | Lu et al. |
| 10,331,897 | B2 | 6/2019 | Zhang et al. |

(Continued)

FOREIGN PATENT DOCUMENTS

| CN | 105868589 A | 8/2016 |
| CN | 106599628 A | 4/2017 |

(Continued)

OTHER PUBLICATIONS

Kiperberg et al. "System for Executing Encrypted Java Programs", 2017, 13 pgs.

(Continued)

*Primary Examiner* — Michael S McNally
(74) *Attorney, Agent, or Firm* — Matthew M. Hullhan; Heslin Rothenberg Farley & Mesiti PC (57) ABSTRACT

A method includes receiving a request to execute bytecode that corresponds to secured program code, the secured program code including an encrypted version of the bytecode. Based on receiving the request to execute the bytecode, the method resolves the request, the resolving including identifying a location on disk of the secured program code. Based on resolving the request, a license file for decrypting the encrypted version of the bytecode for execution is accessed, the license file including an encrypted key-value. The encrypted key-value is used in decrypting the encrypted version of the bytecode to obtain decrypted bytecode, where the decrypting places the decrypted bytecode in working memory, and the decrypted bytecode is executed.

14 Claims, 4 Drawing Sheets

(56) References Cited

U.S. PATENT DOCUMENTS

| | | | |
|---|---|---|---|
| 2004/0093229 A1* | 5/2004 | Plain | G06Q 30/0239 |
| | | | 705/14.27 |
| 2004/0230949 A1* | 11/2004 | Talwar | G06F 21/52 |
| | | | 718/1 |
| 2005/0086501 A1* | 4/2005 | Woo | G06F 21/10 |
| | | | 713/189 |
| 2010/0205459 A1* | 8/2010 | Schwarz | G06F 21/554 |
| | | | 713/189 |
| 2011/0035601 A1 | 2/2011 | Davidson et al. | |
| 2012/0246487 A1* | 9/2012 | Gu | G06F 21/51 |
| | | | 713/190 |
| 2017/0206363 A1 | 7/2017 | Zhang et al. | |

FOREIGN PATENT DOCUMENTS

| | | |
|---|---|---|
| EP | 3029595 A2 | 6/2016 |
| WO | WO1999041651 A2 | 8/1999 |
| WO | WO2016139078 A1 | 9/2016 |

OTHER PUBLICATIONS

Seitzer et al., "A Bytecode Interpreter for Secure Program Execution in Untrusted Main Memory", ESORICS 2015 Computer Security—ESORICS 2015, pp. 376-395 (20 pgs.).

* cited by examiner

DECRYPT AN ENCRYPTED KEY-VALUE INCLUDED IN A LICENSE FILE TO OBTAIN A DECRYPTED KEY-VALUE — 302

STORE THE DECRYPTED KEY-VALUE INTO WORKING MEMORY — 304

DECRYPT AN ENCRYPTED VERSION OF BYTECODE WITH THE DECRYPTED KEY-VALUE — 306

OBTAIN DECRYPTED BYTECODE FOR EXECUTION — 308

CODE PROTECTION

BACKGROUND

Distribution of code, such as bytecode, for software projects between individuals or organizations in collaboration may be desirous. Conditional licensure permissions may be granted to provide access to certain project functionalities or features based on licensing terms. However, precautions taken to limit these permissions so that end users do not have access to the code may be difficult without providing end users with different versions of software licensure packages rather than complete versions of the software product.

SUMMARY

If the code of a project is unprotected, this poses certain risks such as potential intellectual property theft or code modification. A need exists to be able to securely distribute code. Additionally, desired functionality may be to limit use by end-users via conditional licensure permissions in order to protect the intellectual property of the code and inhibit code modification, as examples.

Shortcomings of the prior art are overcome and additional advantages are provided through the provision of a computer-implemented method. The method includes receiving a request to execute bytecode that corresponds to secured program code, where the secured program code includes an encrypted version of the bytecode. Based on receiving the request to execute the bytecode, the method may further resolve the request, where the resolving includes identifying a location on disk of the secured program code. Based on resolving the request, a license file may be accessed for decrypting the encrypted version of the bytecode for execution, where the license file includes an encrypted key-value. The encrypted version of the bytecode may be decrypted, using the encrypted key-value, to obtain decrypted bytecode, where the decrypting places the decrypted bytecode in working memory. The method may additionally execute the decrypted bytecode.

Further, a computer system is provided that is configured to perform a method. The method includes receiving a request to execute bytecode that corresponds to secured program code, where the secured program code includes an encrypted version of the bytecode. Based on receiving the request to execute the bytecode, the method may further resolve the request, where the resolving includes identifying a location on disk of the secured program code. Based on resolving the request, a license file may be accessed for decrypting the encrypted version of the bytecode for execution, where the license file includes an encrypted key-value. The encrypted version of the bytecode may be decrypted, using the encrypted key-value, to obtain decrypted bytecode, where the decrypting places the decrypted bytecode in working memory. The method may additionally execute the decrypted bytecode.

Further, a computer program product is provided that includes a computer readable storage medium storing instructions for execution to perform a method. The method includes receiving a request to execute bytecode that corresponds to secured program code, where the secured program code includes an encrypted version of the bytecode. Based on receiving the request to execute the bytecode, the method may further resolve the request, where the resolving includes identifying a location on disk of the secured program code. Based on resolving the request, a license file may be accessed for decrypting the encrypted version of the bytecode for execution, where the license file includes an encrypted key-value. The encrypted version of the bytecode may be decrypted, using the encrypted key-value, to obtain decrypted bytecode, where the decrypting places the decrypted bytecode in working memory. The method may additionally execute the decrypted bytecode.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Described herein are facilities for protection of source code of various execution environments. Example source code is bytecode (or any other form of code), and an example execution environment is Python® (PYTHON is a registered trademark of the Python Software Foundation, Hampton, N.H., United States). Bytecode is protected by encrypting it on disk to produce an encrypted version of the bytecode. This encrypted version of the bytecode is packaged/encapsulated/included in a file. The phrases "secure program code" and "secure code" as used herein refers to the encrypted version of the bytecode or more generally to the file in which it is included. Based on receiving a request to execute the bytecode (i.e. that corresponds to this secured program code), a process resolves the request by identifying a location on the disk of the secured program code. The process decrypts the encrypted version of the bytecode so that the bytecode (in its original unencrypted form) can be executed. Advantageously, a source code protection facility described herein allows bytecode to be securely distributed, with protections thereon. Further, aspects can provide built-in licensing support, allowing for fine-grained control of features and product configuration at runtime, thereby allowing projects with complete functionality to be distributed while conditionally limiting access to components, features, and/or functionality thereof based on licensure terms and conditionally limiting access to (decryption of) appropriate segments of the secure code.

Aspects described herein enable incorporation of a source code protection facility into existing execution environments with minimal or no modification to existing project code. A source code protection facility is incorporated into an existing execution environment, e.g. Python®, by, in one embodiment, passing original (e.g. non-encrypted, plaintext, "unsecured", or "source") bytecode, e.g. script(s) for instance, of the particular execution environment through a 'bootstrap' module of the source code protection facility. For example, the original bytecode can be wrapped within an operating system (OS) shell script, such as GNU Bash script for Unix/Linux operating systems or a "batch" file script for the Windows® line of operating systems offered by Microsoft Corporation, Redmond, Wash., U.S.A. (of which WINDOWS is a registered trademark). To resolve the request to execute the particular bytecode, the request may be resolved to the shell script that calls the bootstrap module. In examples where a subprocess is called/spawned to execute other environment code (such as other Python code), argument(s) of the subprocess request can be modified to invoke the bootstrap module, e.g. by calling to a shell script in which that other environment code is wrapped. Aspects can be accomplished by modifying an import feature of the execution environment during runtime of the (parent) process provide proper request resolution.

Advantages provided by the source code protection facility include:

SIDELOADED DEVELOPMENT AND PRODUCTION: Aspects support proper loading of source files of both original code of the execution environment, such as standard .py bytecode files for Python®, and secured program code (that includes an encrypted version of code) as described herein, to provide side-by-side execution of both. This can advantageously facilitate project development because it removes the need to perform runtime checks to determine if an application is executing within a protected context.

OPT-IN PROTECTION: Original bytecode of an execution environment, e.g. .py source files for Python®, and secured program code can be co-located within the same directory. Advantageously, a user may opt-in to implement the secured program code feature on portions of a project, allowing for some unsecured bytecode or source files to be distributed as their original source code and others to be secured and distributed as secure program code files. This aspect may be particularly useful for projects that have a public application programming interface (API) or plugin system where viewing at least some of the original source code is a feature.

BUNDLED LICENSING: The source code protection facility can include licensing support to control, e.g., the software expiration date and generic application-specific feature configuration. The generic feature configuration can allow for projects to be distributed with every feature included, with some or all of the features included being encrypted using a set of keys. Various features can be enabled or disabled at runtime based on the license terms that control which key(s) can be accessed to decrypt the different code segments (files, blocks, portions, etc.) providing the corresponding different features. As an example, some code of the project can be provided in unencrypted form (or encrypted using key accessible to all), while other code of the project can be protected using one or more key(s) to selectively control decryption of various code portions. Advantageously, this aspect allows an end user to upgrade their license terms and thereby receive access to key(s) to decrypt otherwise inaccessible code portions, without having to reinstall the software.

SELF-CONTAINED TOOLING: The source code protection facility can be self-contained, including components desired to (i) build a project with secured program code as described herein and (ii) decrypt the secured program code at runtime, such that no external dependencies are required.

EASY FILE-LEVEL PATCHING: The original project directory structure is maintained, when unencrypted bytecode, e.g. .py source code, is compiled to secured program code, as a single source file of unencrypted code can be compiled to a single file of the encrypted version of that code. Maintaining the original project directory structure facilitates patching since, according to some embodiments, the toolkit to perform this action may selectively encrypt and package only unencrypted code that has changed between two references (e.g., commits, tags, branches, etc.) in the source version-control system (e.g. Git, as one example).

The source code protection facility can compile the unsecure bytecode files (e.g. .py files) into protected source code files (e.g. .arte files) via one-to-one mapping, similar to how the GNU C Compiler (GCC) compiles source files having a .c extension (.c file) to an object file having a .o extension (.o file). As one example, a protected source code file includes one or more of the following: (i) encrypted bytecode, which, according to one embodiment, may optionally be compressed (i.e., compressed bytecode), (ii) a number identifying the file as being a secured program code file, (iii) a header format version, (iv) a compilation timestamp of when the original bytecode was encrypted to produce the encrypted version of the bytecode, (v) an indicator of whether the bytecode is compressed bytecode, (vi) a checksum of the original bytecode useful for comparison to a checksum of decrypted version of the encrypted bytecode to identify whether any modification to the original bytecode has occurred after original compilation and the encryption/decryption process, and/or (vii) additional metadata.

According to one embodiment, prior to being released to an end user or a customer, a project that includes unsecured bytecode can be compiled to include protected source code file(s) that include an encrypted version of the unsecured bytecode. Advantageously, no software package requirements are needed for the source code protection facility, which may facilitate distributing projects with the secured program code in any desired format (e.g. zip/tar archive as examples). Alternatively, the projects can be distributed via a product installation engine and/or as part of an OS-specific installer file/package, such as, e.g. a Microsoft's Windows® Installer package. Further, the end user can be provided with a generated license file that includes project license terms and restrictions. For instance, the license file can include a generic product configuration such as, for example, a basic key that is encrypted on disk and decrypted in memory at runtime. To decrypt an encrypted version of the bytecode for execution, the license file includes an encrypted key-value that is accessed to decrypt the encrypted version of the bytecode. Further, because the license file can be encrypted, it can be protected from modification and be used to restrict or enable functionality of various features at runtime by including a plurality of keys that decrypt different portions of the secured program code, the different portions corresponding to different functions, modules, or the like. The end-user's access to the various keys can be controlled to, thereby, control which portions of the secured program code can be decrypted and therefore executed/run by the end-user. Advantageously, this aspect allows for distribution of a project that bundles all available features but conditionally/selectively controls at runtime which of those features are available by way of selective decryption of the secured program code depending on which key(s) are made available via the license file. Additionally, this aspect allows for upgrading the license permissions without requiring reinstallation of the project, as the upgrade can be effected by granting access to the key(s) that decrypt the portion(s) of code implementing upgraded features of the software.

At runtime, the source code protection facility can modify the import system of the execution environment to add support for discovering and importing the encrypted version of the bytecode. In an example process, a bootstrapping process can first load the license file which includes an encrypted key, the encrypted key being an encrypted version of a decryption key that decrypts the encrypted version of the bytecode to produce unencrypted bytecode for execution.

Example steps to add support for the source code protection facility within a project and encrypt the project bytecode (i.e. project source file(s)) for distribution can include:

- Building a project with the source code protection facility—craft a file (e.g. artemis_make.yml) akin to a C 'Makefile' that instructs the source code protection facility which source files to encrypt.
- Establishing execution environment library support—modify any calls that spawn child processes, e.g. via a subprocess module, so that they are compatible with the source code protection facility.
- Providing a launch script for launching the source code protection facility—add or modify executable scripts that launch the project's main application so that it is compatible with the source code protection facility.
- Generating a product token used to encrypt/decrypt source files.

Additionally, according to some embodiments, example steps may also include:

- Controlling functionality through licensing—the project can be updated using licensing requirements so that various functionality is selectively controlled or otherwise limited.
- Generating licenses—the appropriate licenses can be generated for known end-users.

An example source code protection facility compiles the secured program code, which includes the encrypted version of the bytecode, by compiling the original code, e.g., Python source code, to a code object using, e.g., a standard Python library compile( ) method. In particular, the code object is converted to a byte string suitable for writing to disk using, e.g., a marshal.dumps( ) method. The resulting bytecode, which is a bytes object, is then encrypted and encapsulated in a source code header. The example source code protection facility uses a cipher, e.g., AES-256 CBC, for encryption. The encryption key is 32 bytes in one example, and Initialization vectors (IVs) are 16 bytes, in one example. The encryption keys may, according to various embodiments, originate from a pre-shared password, a unique hardware token generated when the project software initializes, or a randomly generated byte string, as examples. Since a source byte string may not necessarily be 32 bytes long, the source code protection facility may produce a 32-byte string that can be used as an encryption key by calculating a hash function, e.g., a SHA-256 digest, of the input byte string. Likewise, encryption IVs may be created by calculating a digest, e.g. an MD5 digest, of various input byte string(s) to produce a 16-byte string.

An example source code protection facility can, at runtime, extend the import system of the execution environment so that secured program code can be loaded as modules. For instance, an interpreter of the execution environment (e.g. CPython for a Python® environment) can be used so that all changes are temporal and local to only the single loaded process of the execution environment. Advantageously, extending the import system at runtime facilitates importing the modules (e.g. of secured program code) without needing to change how the modules are imported, regardless of whether the modules are imported as, e.g., a C module, a Python source file, or the secured program code. Thus, aspects described herein may enable one module to access code in another module by using, e.g., an import statement to invoke the import system. Thus, the import system importing the secured program code with the encrypted bytecode may process familiar import statements such as, e.g.:

import my_app
    from my_lib.mod import some_function
    import my_app2 as my_other_app Additionally, an example import system may assume that a module's code, which may exist across several source files, must originate from a single source such as, e.g., a single filesystem directory or a single .zip file. A user may opt-in to implement the source code protection facility functionality and, based on this assumption, projects can side load source code files (e.g. Python source code files, the secured program code, which includes the encrypted version of the bytecode, etc.) within the same module and origin directory.

An example import system can include the following components:

1. Finder—resolves module names (somemodule.submod.func) to a location. A location can be a file system path, a registry key path, or anything that uniquely identifies where a module is located. A common finder for third-party modules is the FileFinder, which resolves module names to the original source code, e.g. Python source code, file(s) on disk.

2. Loader—translates a location, as identified by a Finder, to the module that includes the secured program code, which can include the encrypted version of the bytecode as well as module metadata. A common loader for third-party modules is the SourceFileLoader, which can read original source code, e.g. Python source code, file(s) from disk, compile the original source code file(s) to bytecode, and load the module metadata.

In an example process, a request to execute the bytecode can be received within a Python® execution environment. As indicated, the Python execution environment can include: (i) a finder component that performs identifying the location on the disk of the secured program code and (ii) a loader component that performs accessing the license file and decrypting the encrypted version of the bytecode. Some execution environments such as, e.g., the Python® execution environment, might recommend implementing a custom Finder subclass and a custom Loader subclass for the import system. However, since an example source code protection facility described herein facilitates loading modules from disk, in one approach, the execution environment's native Finder, e.g. FileFinder, class is patched to add support for resolving module names to secured program code on disk. The patched native Finder can thereby resolve a name, as provided in a request to execute bytecode that corresponds to secured program code, of a file having the bytecode to a file name of the secured program code. Advantageously, by co-opting the native Finder in this manner, both unsecured source code file(s) and secured program code files can exist within the same directory on disk and be properly loaded without having to implement a custom Finder subclass for the import system.

Figure 1:
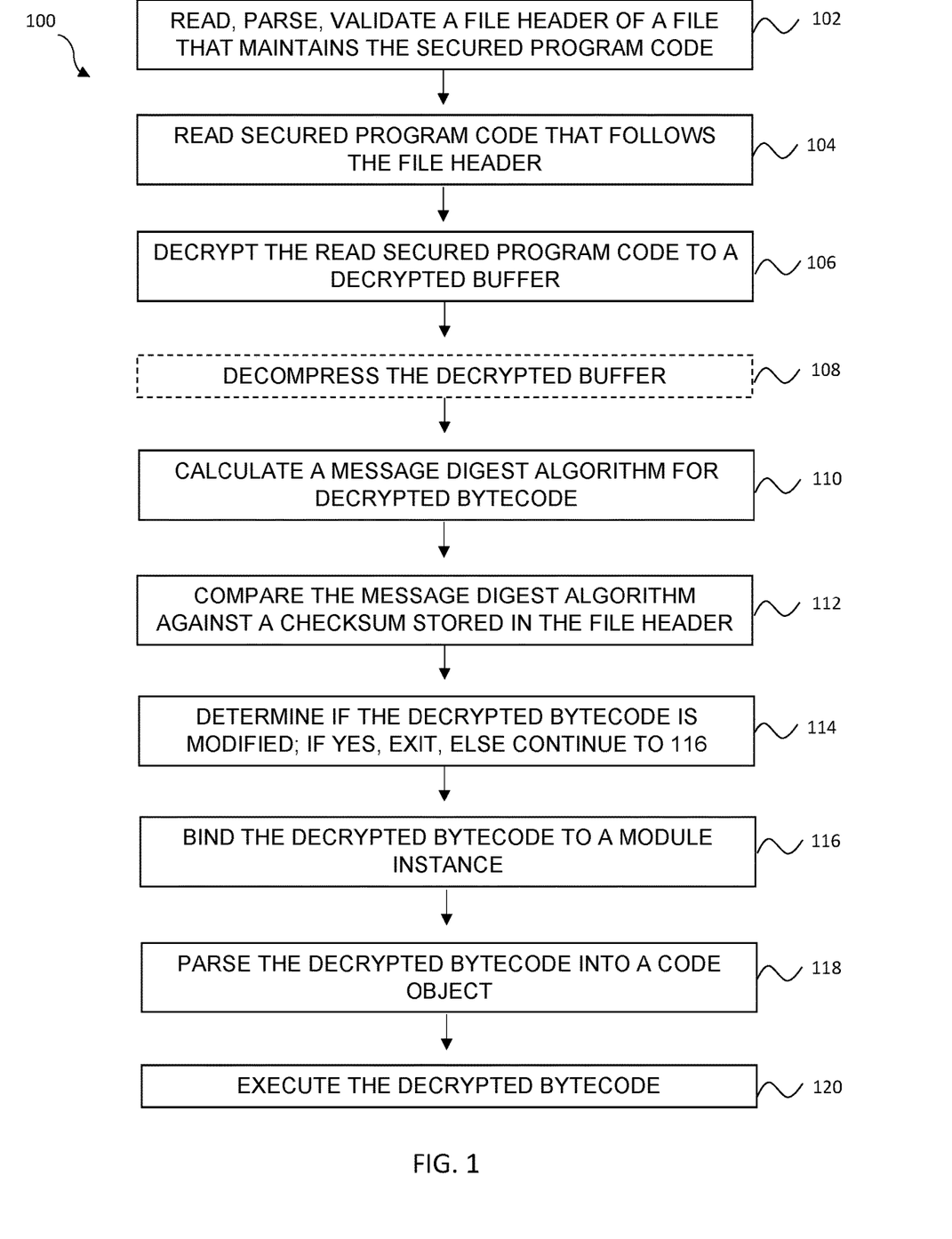
FIG. 1 depicts an example process performed by a custom Loader, in accordance with an aspect of the present disclosure.

FIG. 1 depicts an example process 100 performed by a custom Loader, possibly in cooperation with other component(s) of and execution environment. Based on resolving a module name to the location on disk of the secured program code (i.e. by way of the Finder component), a custom Loader is able to read the secured program code from disk and decrypt the encrypted version of the bytecode for execution. For instance, an example custom file Loader can perform the following:

1. Read, parse and validate 102 a file header of the file that maintains the secured program code. An example header can include a number, i.e. "magic number", identifying or otherwise denoting the file as being a secured program code file (i.e. encrypted source file). Additionally, the example header can include a header format version, a timestamp of when the bytecode was encrypted to produce the encrypted version of the bytecode, and/or bytecode compression method information such as, for example, an indicator of whether the bytecode is compressed bytecode. Further, the example header can also include a checksum of the bytecode requested for execution, where the checksum can be used to identify whether the decrypted bytecode is consistent with the bytecode requested for execution to verify that the original bytecode has not been modified. For instance, the checksum can be the message digest (e.g. MD5 digest) of the bytecode requested for execution (i.e. the original bytecode prior to encrypting). It could also be the IV used in performing the encryption of the bytecode.

2. Read 104 the secured program code that follows the file header. Based thereon, decrypt 106, to a decrypted buffer, the secured program code that was read.

3. Optionally, based on an indicator in the header indicating that the bytecode is compressed bytecode, decompress 108 the decrypted buffer. The decompression process can use the algorithm specified or indicated in the file header.

4. Calculate 110 the message digest (e.g. MD5 digest) for the decrypted bytecode and compare 112 the message digest against a checksum stored in the file header. If the process determines 114 that the checksums are not equal, then the secured program code has been modified and the process ends. Additionally, the source code protection facility can raise an error indicating that the file that includes the secured program code is invalid. If the secured program code has not been modified, then the process continues.

5. Based on obtaining the decrypted bytecode and the decrypted bytecode being verified as being unmodified, binding 116 the decrypted bytecode to a module instance and updating a list of loaded modules. Further, the decrypted bytecode can be parsed 118 into a code object using, e.g., marshal.loads( ), and executed 120 within the context of the module using, e.g., a built-in function (e.g. exec( )). Execution of the module can facilitate binding of the decrypted bytecode and the module and facilitate evaluating, by an interpreter, the decrypted bytecode.

As indicated, the checksum (e.g. MD5 digest) in the file header enables verification of the original bytecode and the decrypted bytecode. The checksum of the original bytecode requested for execution can be obtained from the file header and compared to a checksum of the decrypted bytecode. Based on the comparing, it can be determined whether the decrypted bytecode matches, and is therefore consistent with, the original bytecode for when execution was requested. Advantageously, this verification provides double-factor verification which requires: (i) that the checksum includes the correct 16-byte IV value in order for the bytecode to be decrypted, otherwise decryption will fail; and (ii) that the message digest of the decrypted bytecode is calculated and compared against the checksum stored within the file header. In other words, since the checksum (e.g. MD5 digest) of the original (unencrypted) bytecode (or a variant/subpart of the MD5 digest) can be used as the IV when encrypting the bytecode, if a change is made to the bytecode, both decryption and the digest check will fail while loading the module.

According to one embodiment, the file with the secured program code can have a file extension specific to the source code protection facility (e.g., a .arte file extension). For instance, if an application had an original source file name: lib/format.py, the file having the secured program code can be named: lib/format.arte.

Figure 2:
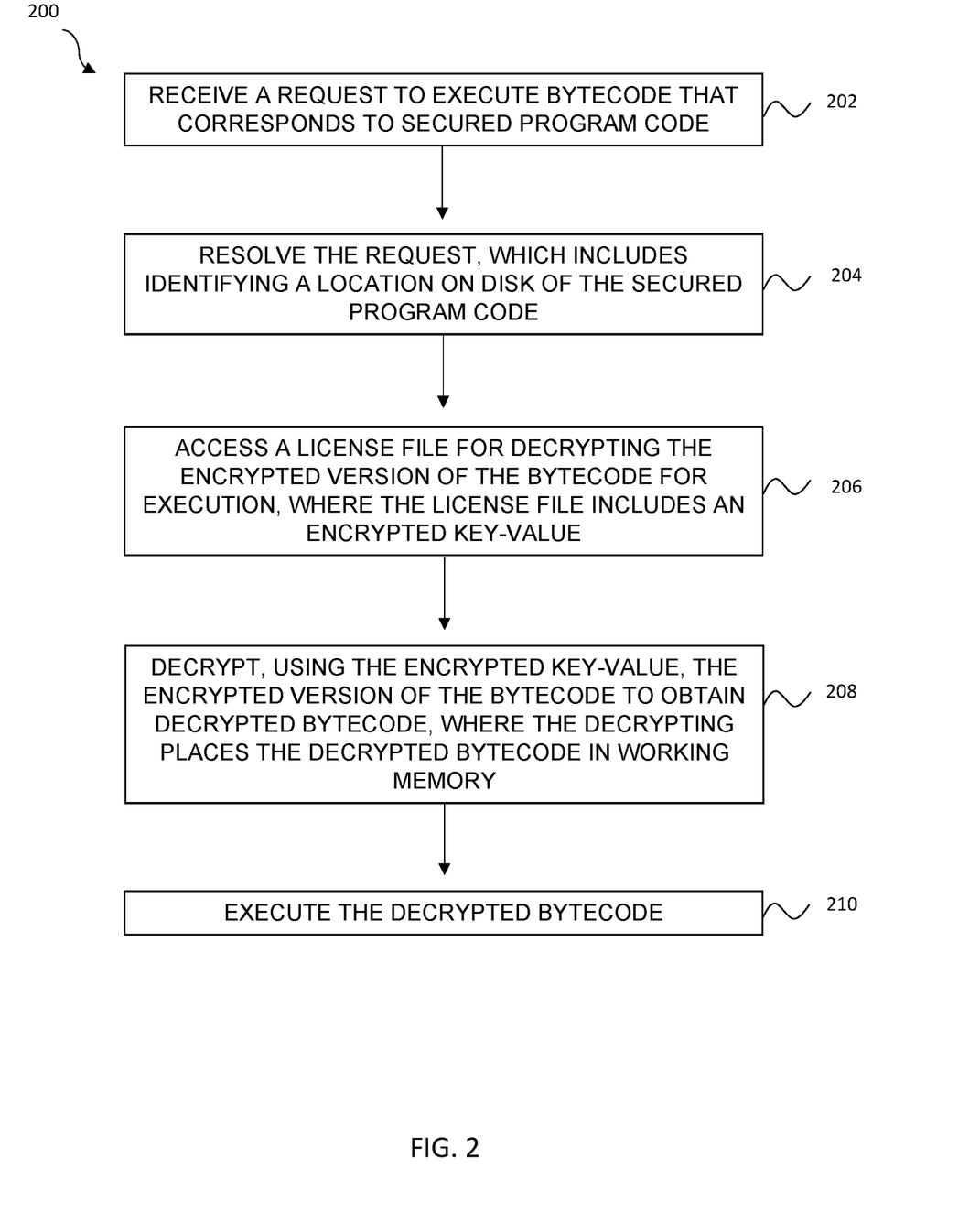
FIG. 2 depicts an example of a computer-implemented method for executing bytecode that has been compiled using the source code protection facility, in accordance with aspects described herein.

Accordingly, FIG. 2 depicts an example of a computer-implemented process 200 for executing bytecode that has been compiled using the source code protection facility, in accordance with aspects described herein. In some examples, the process is performed by one or more computer systems, such as those described herein, which may include one or more database system(s)/server(s), file server(s), and/or one or more other computer systems. The one or more computer systems may include a memory and a processor in communication with the memory where the processor is configured to perform the computer-implemented process 200.

The example process 200 begins by receiving 202 a request to execute bytecode that corresponds to secured program code. The request may be a request to execute unsecured code (such as a .py file) for which there exists corresponding secured program code, or a request to execute the secured program code itself, if the caller is configured to call the secured program code directly, for instance. The secured program code includes an encrypted version of the bytecode being requested for execution. Based on receiving the request to execute the bytecode, the process resolves 204 the request. The resolving includes identifying a location on disk of the secured program code. Further, based on resolving the request, the process accesses 206 a license file for decrypting the encrypted version of the bytecode for execution. The license file includes a key-value (decryption key), perhaps stored in encrypted form (i.e. as an encrypted key-value). The process decrypts 208 the encrypted version of the bytecode using the key-value in order to obtain decrypted bytecode, and the decrypting places the decrypted bytecode in working memory (e.g. RAM) of the computer system to execute the decrypted bytecode. The process then executes 210 the decrypted bytecode.

Figure 3:
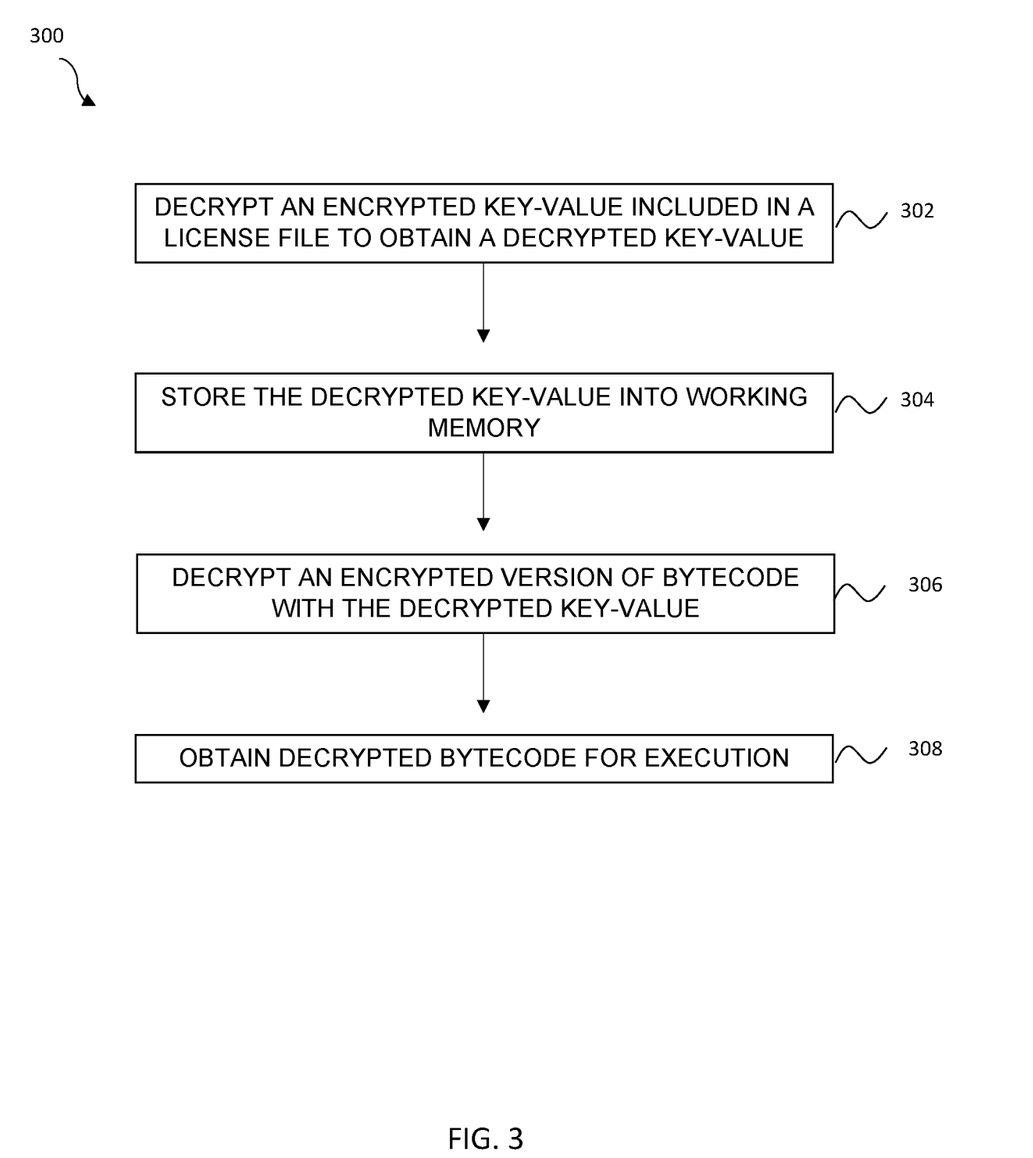
FIG. 3 depicts an example process of using a license file for decrypting the encrypted version of the bytecode for execution, in accordance with aspects described herein.

In cases where the key-value is stored in encrypted form (as an encrypted key-value), the process uses the encrypted key-value to decrypt the encrypted bytecode by first decrypting the encrypted key-value to produce a decrypted version of the encrypted key-value, i.e. a suitable decryption key to decrypt the encrypted bytecode. This is an aspect of FIG. 3, depicting an example process 300 of using a license file for decrypting the encrypted version of the bytecode for execution, in accordance with aspects described herein. The example process decrypts 302 the encrypted key-value included in the license file to obtain a decrypted key-value, stores 304 the decrypted key-value into working memory, and then decrypts 306 the encrypted version of the bytecode with the decrypted key-value. The process thereby obtains 308 the decrypted bytecode for execution.

As previously indicated, the source code protection facility can provide, via the license file, built-in licensing support to control, at runtime, which features are accessible. Thus, product configuration is controlled based on licensure terms.

An example format for license terms is the JSON format, and example template files for the license terms are YAML files. Meanwhile, as explained above, an implementation of MD5 (such as OpenWall MD5) provides AES IV generation from a password, license, and/or source file checksum, an appropriate SHA-256 algorithm implementation (such as B-Con SHA-256) provides AES key generation from a password, and an appropriate AES-256 algorithm implementation (such as Tiny-AES-c) provides source file and license terms encryption and decryption.

Library support can bootstrap the source code protection facility prior to loading any of the protected product's code so that the import system can locate and decrypt the protected source code. According to one embodiment, all child processes spawned that require support from the source code protection facility would also be bootstrapped to the source code protection facility. For instance, using the Python execution environment by way of example, processes launched through the known 'subprocess' and 'multiprocessing' modules can be bootstrapped to the source code protection facility. Licenses used in the parent process can be automatically applied to all children processes of the parent process.

The bootstrap procedure can be initiated by one of two example methods:

1. Manually importing the source code protection facility and calling a method that requires that all entry point scripts are plain scripts (e.g. plain Python scripts) and are not encrypted with the source code protection facility. However, in this example method, entry points cannot include sensitive logic or code.

2. Launch the entry point script, _main_, through the source code protection facility bootstrap entry point script, which can be of an archive (e.g. .zip) file type. This example method enables application of entry point scripts to be encrypted and these entry point scripts would not need to be modified to be compatible with the source code protection facility. As an example, using a Python® execution environment, if an application is launched using the following command line call:

python myapp.py--verbose--some-arg 1

The command line call could be modified to first invoke the source code protection facility bootstrap script ('artemis.zip' in this example) and to launch the myapp.py script:

python artemis.zip--myapp--verbose--some-arg 1

The new command line call first launches the source code protection facility (referred to as 'Artemis' here) bootstrap script, contained in artemis.zip, and the facility then loads, decrypts, and launches the myapp module. The bootstrap script can be configured to launch both secured program code and standard Python source files.

The modifications to the import system that the source code protection facility makes at runtime can be local to a specific process. A process performed by the source code protection facility can spawn all sub/child processes through the source code protection facility bootstrap script so that the source code protection facility can be initialized prior to loading the secured program code source file(s). Common methods of spawning a child process, such as a Python-based child process, with the standard library of the execution environment can include (i) multiprocessing, which launches a class or function as a child process, and (ii) subprocess, which launches a child process script. The source code protection facility enables child processes to be launched using either the multiprocessing or subprocess module.

MULTIPROCESSING—The request to execute bytecode can be received as a request to spawn a child process from a parent process. The request may indicate that the child process is to be spawned using the 'multiprocessing' feature of the execution environment, for instance via a call to the multiprocessing module. Receipt of this request may cause the facility to invoke a bootstrap script that modifies an import feature of the execution environment during runtime of the parent process in order to resolve that request to the secured program code encrypted version of the target bytecode to decrypt that encrypted version into decrypted bytecode for execution.

In an example, the source code protection facility automatically patches a multiprocessing module so that child processes spawned using multiprocessing can bootstrap the source code protection facility prior to executing their application code. The source code protection facility can patch the multiprocessing method that generates the child process command line arguments so that the patch modifies command line parameters, thereby launching the source code protection facility bootstrap script prior to the multiprocessing hooks. The multiprocessing module can be hooked without modifying the project's code or design, and the hooks can be automatically applied during the initial bootstrap process so there is no need to manually initialize them.

According to one embodiment, the multiprocessing spawn method is the default spawn method on Windows® systems. In order to support Unix-based systems, the code to start the multiprocessing method can be explicitly set by calling, with the "spawn", the following: multiprocessing.set_start_method( ).

SUBPROCESS—The request to execute the bytecode could alternatively be received as a subprocess request to spawn a subprocess of a process using a subprocesses feature of an execution environment. In order to perform the request, arguments of the subprocess request can be modified to invoke a bootstrap script that modifies an import feature of the execution environment during runtime of the process to resolve the request to the secured program code.

Although multiprocessing support can be automatic and transparent to the application, subprocess support will typically be explicitly enabled. Explicit enablement may be necessary if there is no central method of generating a subprocess command line argument, so it would be incumbent on the caller to generate the correct command line argument for the child process. According to one example, Python-based subprocesses that are launched by the subprocess module will be dependent on the source code protection facility being bootstrapped prior to loading any secured program code, and the subprocess support will be manually enabled on a per-subprocess basis.

An example method to generate the correct command line argument sequence when given a file to execute using the source code protection facility is as follows: get_python_bootstrap_args( ). This example method facilitates bootstrapping the source code protection facility to manually enable the subprocess support and is performed prior to executing the secured program code. Once the source code protection facility is bootstrapped, then the provided secured program code that spawns a subprocess can be executed. In an example source code protection facility referred to herein as Artemis, to spawn an example Python-based subprocess the command line argument can be as follows:

```
import subprocess
    child=subprocess.run([sys.executable, 'myapp.py',
'--verbose','--some-arg', '1'])
```
A Artemis-compatible version of this code block might be the following:
```
import subprocess
    args=ArtemisImportSystem.get_python_bootstrap_args
('myapp')
    child=subprocess.run(args+['--verbose','--some-arg',
'1'])
```
Subprocess support in this manner can handle various common scenarios of launching a subprocess, for example:

1. Executing a source code protection facility and/or Python® _main_ script; and
2. Loading a source code protection facility and/or Python® module and then calling a function within the module with no arguments.

Either scenario can be enabled by wrapping the subprocess command line call within a call to the bootstrap _main_ script of the source code protection facility, which can be returned by the import system args( ). For instance, if an example source code protection facility Import system is called by 'ArtemisImportSystem', then the import system args( ) can be the following: ArtemisImportSystem.get_python_bootstrap_args( ). The resulting command line arguments can be passed to the subprocess call and initialize the import system of the source code protection facility prior to loading any modules required by the subprocess.

The following example may be used by a project to spawn a subprocess:
```
subprocess.run([sys.executable, "runme.py", "-a", "--verbose"])
```
Once support for the source code protection facility is added to the project, the command line call can be changed so that the source code protection facility is bootstrapped prior to executing the runme.py file. For example, if the source code protection facility is Artemis, the following changes may be used to spawn the subprocess:

```
artemis_args = ArtemisImportSystem.get_python_bootstrap_args(
pyfile="runme.arte"
)
subprocess.run(artemis_args + ["-a", "--verbose"])
```

In this example, the artemis args could be the following: [sys.executable, "path/to/artemis", "--license", "path/to/current/license", "runme.arte"].

As discussed above, in order to decrypt the encrypted version of the bytecode, an example process uses a key-value that was previously encrypted, which is then decrypted, at runtime, to decrypt the encrypted version of the bytecode. According to one embodiment, the key-value used for encryption and decryption of the bytecode can be securely stored in a product token. A product token can be securely stored by the organization distributing the project protected by the source code protection facility and may not be distributed with the source code protection facility. An example product token is 96 characters long and includes the password protected secret key and a checksum of the secret key. The following is an example product token that includes a message digest, i.e. a MD5 checksum: e830781dc8786c5ab20edd3f8dd82553da690a3af37 994bc3973015a9c35a735680653e47cb3b8e1df7f5 0870c94fa16. In this example, the MD5 Checksum would be e830781dc8786c5ab20edd3f8dd82553 and the secret key would be da690a3af37994bc3973015a9c35a735680653e4 7cb3b8e1df7f50870c94fa16.

In the example product token, the secret key is encrypted using an encryption specification such as AES-256. The 16-byte IV for the AES algorithm in this example is the MD5 checksum of the secret key. The AES key in this example is the SHA-256 hash of the password provided during token creation.

According to one embodiment, a product token that is password protected is considered "locked" and when the secret key is stored in plain text the token is considered "unlocked". The unlocked token can be verified by comparing the checksum, e.g. MD5 checksum, stored in the token against the corresponding hash, e.g. MD5 hash, of the unlocked secret key. Further, the secret key may be stored in plain text only while it resides in memory for use in source file encryption and decryption, which provides protection so that the secret key is never written to disk or stored in other locations. The product token can then be used to create new licenses and encrypt source files. According to one embodiment, the product token can be periodically changed, e.g., at every major release of the software for the source code protection facility to mitigate the risk of the secret key being compromised. To provide additional security, it is advantageous if product tokens are stored in a secure location and the password used to unlock the token is known only by a minimum number of people in charge of creating licenses and building software releases.

A new product token can be generated by, for example, a artemis token script. The example script can accept a single argument, which is the password used to protect the secret key. If the password is not specified, then the script will provide a secure prompt for the password without echoing the characters to the screen. Once generated, the product token can then be copied to a secure location. Further, the token script, e.g. artemis token script, can save the product token directly to a file by specifying the -o/--output argument.

Although various examples are provided, variations are possible without departing from a spirit of the claimed aspects. Various classes can be used to compile source code of an execution environment into secured program code, and various methods can be used to install a license for the source code protection facility.

Figure 4:
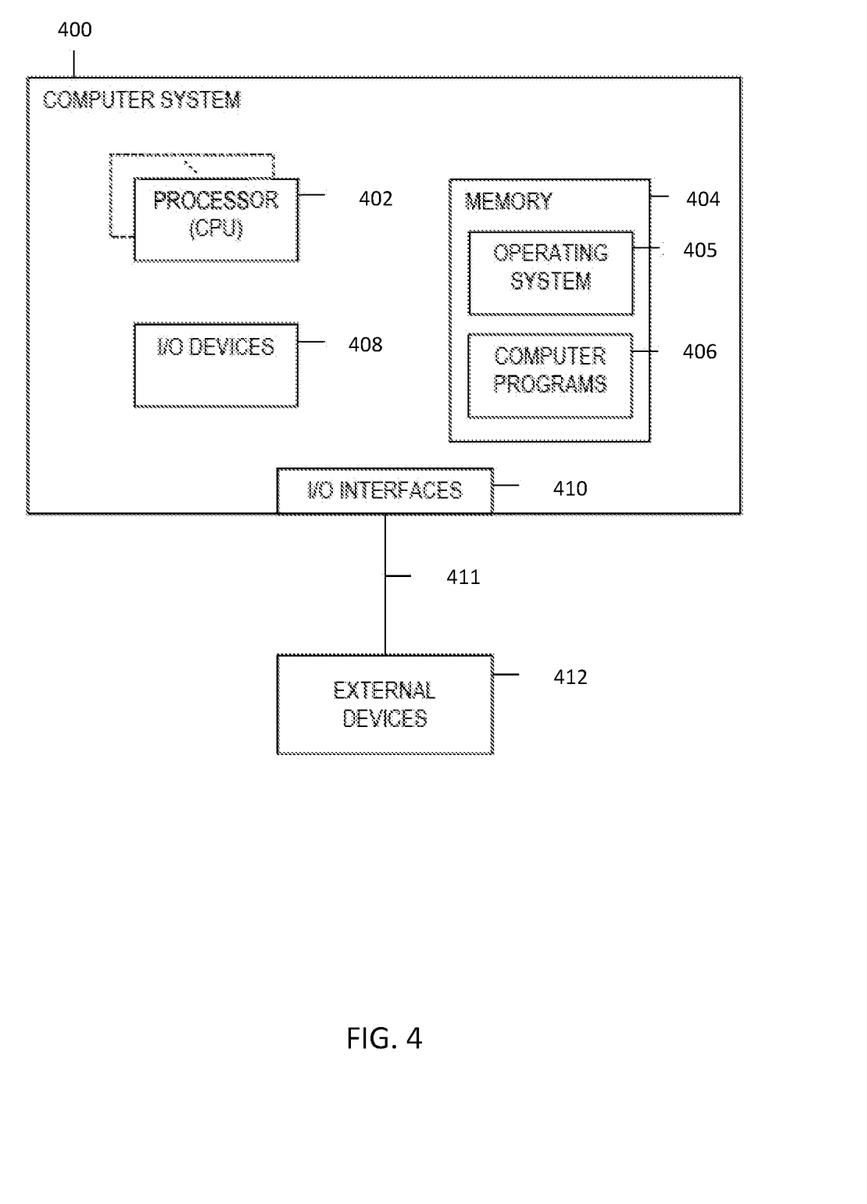
FIG. 4 depicts one example of a computer system and associated devices to incorporate and/or use aspects described herein.

Processes described herein may be performed singly or collectively by one or more computer systems, such as one or more for executing secured program code. FIG. 4 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by Intel Corporation (Santa Clara, Calif., USA) or ARM Holdings plc (Cambridge, England, United Kingdom), as examples.

FIG. 4 shows a computer system 400 in communication with external device(s) 412. Computer system 400 includes one or more processor(s) 402, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 402 can also include register(s) to be used by one or more of the functional components. Computer system 400 also includes memory 404, input/output (I/O) devices 408, and I/O interfaces 410, which may be coupled to processor(s) 402 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 404 can be or include main or system memory (e.g. Random Access Memory) used in the execution of program instructions, storage device(s) such as hard drive(s), flash media, or optical media as examples, and/or cache memory, as examples. Memory 404 can include, for instance, a cache, such as a shared cache, which may be coupled to local caches (examples include L1 cache, L2 cache, etc.) of processor(s) 402. Additionally, memory 404 may be or include at least one computer program product having a set (e.g., at least one) of program modules, instructions, code or the like that is/are configured to carry out functions of embodiments described herein when executed by one or more processors.

Memory 404 can store an operating system 405 and other computer programs 406, such as one or more computer programs/applications that execute to perform aspects described herein. Specifically, programs/applications can include computer readable program instructions that may be configured to carry out functions of embodiments of aspects described herein.

Examples of I/O devices 408 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (412) coupled to the computer system through one or more I/O interfaces 410.

Computer system 400 may communicate with one or more external devices 412 via one or more I/O interfaces 410. Example external devices include a keyboard, a pointing device, a display, and/or any other devices that enable a user to interact with computer system 400. Other example external devices include any device that enables computer system 400 to communicate with one or more other computing systems or peripheral devices such as a printer. A network interface/adapter is an example I/O interface that enables computer system 400 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 410 and external devices 412 can occur across wired and/or wireless communications link(s) 411, such as Ethernet-based wired or wireless connections. Example wireless connections include cellular, Wi-Fi, Bluetooth®, proximity-based, near-field, or other types of wireless connections. More generally, communications link(s) 411 may be any appropriate wireless and/or wired communication link(s) for communicating data.

Particular external device(s) 412 may include one or more data storage devices, which may store one or more programs, one or more computer readable program instructions, and/or data, etc. Computer system 400 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 400 may be operational with numerous other general purpose or special purpose computing system environments or configurations. Computer system 400 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Aspects of the present invention may be a system, a method, and/or a computer program product, any of which may be configured to perform or facilitate aspects described herein.

In some embodiments, aspects of the present invention may take the form of a computer program product, which may be embodied as computer readable medium(s). A computer readable medium may be a tangible storage device/medium having computer readable program code/instructions stored thereon. Example computer readable medium(s) include, but are not limited to, electronic, magnetic, optical, or semiconductor storage devices or systems, or any combination of the foregoing. Example embodiments of a computer readable medium include a hard drive or other mass-storage device, an electrical connection having wires, random access memory (RAM), read-only memory (ROM), erasable-programmable read-only memory such as EPROM or flash memory, an optical fiber, a portable computer disk/diskette, such as a compact disc read-only memory (CD-ROM) or Digital Versatile Disc (DVD), an optical storage device, a magnetic storage device, or any combination of the foregoing. The computer readable medium may be readable by a processor, processing unit, or the like, to obtain data (e.g. instructions) from the medium for execution. In a particular example, a computer program product is or includes one or more computer readable media that includes/stores computer readable program code to provide and facilitate one or more aspects described herein.

As noted, program instruction contained or stored in/on a computer readable medium can be obtained and executed by any of various suitable components such as a processor of a computer system to cause the computer system to behave and function in a particular manner. Such program instructions for carrying out operations to perform, achieve, or facilitate aspects described herein may be written in, or compiled from code written in, any desired programming language. In some embodiments, such programming language includes object-oriented and/or procedural programming languages such as C, C++, C#, Java, etc.

Program code can include one or more program instructions obtained for execution by one or more processors. Computer program instructions may be provided to one or more processors of, e.g., one or more computer systems, to produce a machine, such that the program instructions, when executed by the one or more processors, perform, achieve, or facilitate aspects of the present invention, such as actions or functions described in flowcharts and/or block diagrams described herein. Thus, each block, or combinations of blocks, of the flowchart illustrations and/or block diagrams depicted and described herein can be implemented, in some embodiments, by computer program instructions.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
receiving a request to execute bytecode that corresponds to secured program code, the secured program code including an encrypted version of the bytecode, wherein the secured program code is maintained in a file;
based on receiving the request to execute the bytecode, resolving the request, the resolving including identifying a location on disk of the secured program code;
based on resolving the request, accessing a license file for decrypting the encrypted version of the bytecode for execution, the license file including an encrypted key-value, and, further based on resolving the request, validating a file header of the file that maintains the secured program code, the file header comprising at least one selected from the group consisting of: a number identifying the file as being a secured program code file, a header format version, a timestamp of when the bytecode was encrypted to produce the encrypted version of the bytecode, an indicator of whether the bytecode is compressed bytecode, and a checksum of the bytecode requested for execution, the checksum for identifying whether the decrypted bytecode is consistent with the bytecode requested for execution;
decrypting, using the encrypted key-value, the encrypted version of the bytecode to obtain decrypted bytecode, wherein the decrypting places the decrypted bytecode in working memory; and
executing the decrypted bytecode,
wherein the file header comprises the indicator of whether the bytecode is compressed bytecode and the indicator indicates that the bytecode is compressed bytecode, wherein the method further comprises decompressing the decrypted bytecode, and wherein the executing the decrypted bytecode executes the decompressed decrypted bytecode.

2. The method of claim 1, wherein the file header comprises the checksum of the bytecode requested for execution, and wherein the method further comprises:
obtaining from the file header the checksum of the bytecode requested for execution;
comparing the checksum of the bytecode requested for execution to a checksum of the decrypted bytecode; and
determining, based on the comparing, whether the decrypted bytecode matches, and is therefore consistent with, the bytecode requested for execution.

3. A computer-implemented method comprising:
receiving a request to execute bytecode that corresponds to secured program code the secured program code including an encrypted version of the bytecode;
based on receiving the request to execute the bytecode, resolving the request, the resolving including a location on disk of the secured program code;
based on resolving the request, accessing a license file for decrypting the encrypted version of the bytecode for execution, the license file including an encrypted key-value;
decrypting, using the encrypted key-value, the encrypted version of the bytecode to obtain decrypted bytecode, wherein the decrypting places the decrypted bytecode in working memory; and executing the decrypted bytecode,
wherein the using the encrypted key-value comprises decrypting the encrypted key-value to obtain a decrypted key-value, storing the decrypted key-value into the working memory, and decrypting the encrypted version of the bytecode with the decrypted key-value to obtain the decrypted bytecode.

4. A computer-implemented method comprising:
receiving a request to execute bytecode that corresponds to secured program code, the secured program code including an encrypted version of the bytecode;
based on receiving the request to execute the bytecode, resolving the request, the resolving including identifying a location on disk of the secured program code,
based on resolving the request, accessing a license file for decrypting the encrypted version of the bytecode for execution, the license file including an encrypted key-value;
decrypting, using the encrypted key-value, the encrypted version of the bytecode to obtain decrypted bytecode, wherein the decrypting places the decrypted bytecode in working memory; and
executing the decrypted bytecode,
wherein the request to execute the bytecode is received as a request to spawn a child process, from a parent process, using a multiprocessing feature of an execution environment, and wherein the method further comprises invoking a bootstrap script that modifies an import feature of the execution environment during runtime of the parent process, in order to resolve the request to the secured program code.

5. A computer-implemented method comprising:
receiving a request to execute bytecode that corresponds to secured program code, the secured program code including an encrypted version of the bytecode;
based on receiving the request to execute the bytecode, resolving the request, the resolving including identifying a location on disk of the secured program code;
based on resolving the request, accessing a license file for decrypting the encrypted version of the bytecode for execution, the license file including an encrypted key-value;
decrypting, using the encrypted key-value, the encrypted version of the bytecode to obtain decrypted bytecode, wherein the decrypting places the decrypted bytecode in working memory; and
executing the decrypted bytecode,
wherein the request to execute the bytecode is received as a subprocess request to spawn a subprocess, of a process, using a subprocesses feature of an execution environment, and wherein the method further comprises modifying arguments of the subprocess request to invoke a bootstrap script that modifies an import feature of the execution environment during runtime of the process to resolve the request to the secured program code.

6. A computer-implemented method comprising:
receiving a request to execute bytecode that corresponds to secured program code, the secured program code including an encrypted version of the bytecode;
based on receiving the request to execute the bytecode, resolving the request, the resolving including identifying a location on disk of the secured program code;
based on resolving the request, accessing a license file for decrypting the encrypted version of the bytecode for execution, the license file including an encrypted key-value;
decrypting, using the encrypted key-value, the encrypted version of the bytecode to obtain decrypted bytecode, wherein the decrypting places the decrypted bytecode in working memory; and
executing the decrypted bytecode,
wherein the request to execute the bytecode is received within a Python execution environment, the Python execution environment comprising (i) a finder component that performs the identifying of the location on the disk of the secured program code and (ii) a loader component that performs the accessing of the license file and the decrypting the encrypted version of the bytecode.

7. The method of claim 6, wherein the resolving the request includes resolving a name, as provided in the request, of a file having the bytecode to a file name of the secured program code.

8. A computer system comprising:
a memory, and
a processor in communication with the memory, wherein the computer system is configured to perform a method comprising:
receiving a request to execute bytecode that corresponds to secured program code, the secured program code including an encrypted version of the bytecode, wherein the secured program code is maintained in a file,
based on receiving the request to execute the bytecode, resolving the request, the resolving including identifying a location on disk of the secured program code;
based on resolving the request, accessing a license file for decrypting the encrypted version of the bytecode for execution, the license file including an encrypted key-value, and, further based on resolving the request, validation a file header of the file that maintains the secured program code, the file header comprising at least one selected from the group consisting of: a number identifying the file as being a secured program code file, a header format version, a timestamp of when the bytecode was encrypted to produce the encrypted version of the bytecode, an indicator of whether the bytecode is compressed bytecode, and a checksum of the bytecode requested for execution, the checksum for identifying whether the decrypted bytecode is consistent with the bytecode requested for execution;
decrypting, using the encrypted key-value, the encrypted version of the bytecode to obtain decrypted bytecode, wherein the decrypting places the decrypted bytecode in working memory; and
executing the decrypted bytecode,
wherein the file header comprises the indicator of whether the bytecode is compressed bytecode and the indicator indicates that the bytecode is compressed bytecode, wherein the method further comprises decompressing the decrypted bytecode, and wherein the executing the decrypted bytecode executes the decompressed decrypted bytecode.

9. The computer system of claim 8, wherein the resolving the request includes resolving a name, as provided in the request, of a file having the bytecode to a file name of the secured program code.

10. The computer system of claim 8, wherein the file header comprises the checksum of the bytecode requested for execution, and wherein the method further comprises:

obtaining from the file header the checksum of the bytecode requested for execution;
comparing the checksum of the bytecode requested for execution to a checksum of the decrypted bytecode; and
determining, based on the comparing, whether the decrypted bytecode matches, and is therefore consistent with, the bytecode requested for execution.

11. A computer system comprising:
a memory; and
a processor in communication with the memory, wherein the computer system is configured to perform a method comprising:
receiving a request to execute bytecode that corresponds to secured program code, the secured program code including an encrypted version of the bytecode;
based on receiving the request to execute the bytecode, resolving the request, the resolving including identifying a location on disk of the secured program code;
based on resolving the request, accessing a license file for decrypting the encrypted version of the bytecode for execution, the license file including an encrypted key-value;
decrypting, using the encrypted key-value, the encrypted version of the bytecode to obtain decrypted bytecode, wherein the decrypting places the decrypted bytecode in working memory; and
executing the decrypted bytecode,
wherein the request to execute the bytecode is received as a request to spawn a child process, from a parent process, using a multiprocessing feature of an execution environment, and wherein the method further comprises invoking a bootstrap script that modifies an import feature of the execution environment during runtime of the parent process, in order to resolve the request to the secured program code.

12. A computer system comprising:
a memory; and
a processor in communication with the memory, wherein the computer system is configured to perform a method comprising:
receiving a request to execute bytecode that corresponds to secured program code, the secured program code including an encrypted version of the bytecode;
based on receiving the request to execute the bytecode, resolving the request, the resolving including identifying a location on disk of the secured program code;
based on resolving request, accessing a license file for decrypting the encrypted version of the bytecode for execution, the license file including an encrypted key-value;
decrypting, using the encrypted key-value, the encrypted version of the bytecode to obtain decrypted bytecode, wherein the decrypting places the decrypted bytecode in working memory; and
executing the decrypted bytecode,
wherein the request to execute the bytecode is received as a subprocess request to spawn a subprocess, of a process, using a subprocesses feature of an execution environment, and wherein the method further comprises modifying arguments of the subprocess request to invoke a bootstrap script that modifies an import feature of the execution environment during runtime of the process to resolve the request to the secured program code.

13. A computer program product comprising:
a non-transitory computer readable storage medium storing instructions for execution to perform a method comprising:
receiving a request to execute bytecode that corresponds to secured program code, the secured program code including an encrypted version of the bytecode, wherein the secured program code is maintained in a file;
based on receiving the request to execute the bytecode, resolving the request, the resolving including identifying a location on disk of the secured program code;
based on resolving the request, accessing a license file for decrypting the encrypted version of the bytecode for execution, the license file including an encrypted key-value, and, further based on resolving the request, validating a file header of the file that maintains the secured program code, the file header comprising at least one selected from the group consisting of: a number identifying the file as being a secured program code file, a header format version, a timestamp of when the bytecode was encrypted to produce the encrypted version of the bytecode, an indicator of whether the bytecode is compressed bytecode, and a checksum of the bytecode requested for execution, the checksum for identifying whether the decrypted bytecode is consisted with the bytecode requested for execution,
decrypting, using the encrypted key-value, the encrypted version of the bytecode to obtain decrypted bytecode, wherein the decrypting places the decrypted bytecode in working memory; and
executing the decrypted bytecode,
wherein the file header comprises the indicator of whether the bytecode is compressed bytecode and the indicator indicates that the bytecode is compressed bytecode, wherein the method further comprises decompressing the decrypted bytecode, and wherein the executing the decrypted bytecode executes the decompressed decrypted bytecode.

14. The computer program product of claim 13, wherein the resolving the request includes resolving a name of the bytecode, as provided in the request, to a file name of the secured program code.

* * * * *